United States Patent Office 2,956,975
Patented Oct. 18, 1960

2,956,975
POLYVINYL RESIN COMPOSITION CONTAINING PLASTICIZER AND STABILIZER

Frank P. Greenspan, Williamsville, N.Y., assignor to Food Machinery and Chemical Corporation, San Jose, Calif.

No Drawing. Original application Dec. 8, 1954, Ser. No. 474,030. Divided and this application Dec. 13, 1956, Ser. No. 628,004

6 Claims. (Cl. 260—30.4)

This invention pertains to plasticized polyvinyl resin compositions and more particularly to such resin compositions plasticized with epoxidized esters of tetrahydrophthalic acid.

This application is a division of Serial No. 474,030, now abandoned, filed December 8, 1954, by the same inventor.

It is well known that polyvinyl resins to be useful for many purposes have to be plasticized to make the resin flexible. Flexibility and plasticity is not only required in the manufacture of the plastic products, such as sheets or films, but is also very important in the finished product to obtain good drape and other important use characteristics. Plasticizers used for this purpose must meet certain requirements, most of all the requirement of being compatible with the resin to be plasticized. Moreover, the plasticizer must remain firmly bound with the plastic product so that sweat-out under conditions of use is prevented. Another important requirement is color permanence of the plasticized product which should not discolor when exposed to heat.

A relatively small number of plasticizers meeting these and other requirements are known and in commercial use. One such plasticizer widely used commercially, because of its good overall properties, is dioctyl phthalate. Although this plasticizer performs reasonably well in many respects, resin compositions plasticized with dioctyl phthalate do exhibit discoloration under heat and light.

It has been found, in accordance with the present invention, that a new class of plasticizers, namely the epoxidized esters of tetrahydrophthalic acid, have unusually good properties particularly imparting a high degree of heat stability to polyvinyl resins plasticized with these plasticizers. The chemical structure of the esters of tetrahydrophthalic acid is similar to the chemical structure of the dioctyl ester of phthalic acid and possesses fair plasticizing properties. However, the overall properties of the epoxidized esters of tetrahydrophthalic acid are much superior and the fact that the non-epoxidized ester has plasticizing properties is a definite advantage. In all technical epoxidation processes, complete epoxidation is difficult to achieve and the epoxidation level will ordinarily be only of the order of 70% to 90% of the theoretical value. For this reason it is important that the non-epoxidized part of the product be compatible with the resin to avoid sweat-out. This is the case with the epoxidized esters of tetrahydrophthalic acid.

This is in contrast to epoxy type plasticizers prepared by the epoxidation of unsaturated raw materials which, themselves, are not compatible with resins. The use of such epoxy type plasticizers easily leads to sweat-out under conditions of use because of the incompatibility of that part of the plasticizers not epoxidized.

The plasticizers of this invention may be produced by epoxidation using a peracid such as peracetic acid, as the oxidizing agent. In a typical procedure, dibutyl tetrahydrophthalate was epoxidized with peracetic acid in the following manner.

380 g. of dibutyl tetrahydrophthalate and 13.75 g. of sodium acetate, which serves as a pH adjuster, were placed in a flask equipped with thermometer, reflux condenser, stirrer and dropping funnel. 275 g. of 40% peracetic acid solution were added over a period of 1½ hours, while maintaining the flask and its contents at a temperature of about 10 to 25° C. by means of a cooling bath. After the peracetic acid had been added, the reaction with constant stirring was permitted to proceed at about 25 to 30° C. for 7½ hours. After this time, reaction rate was found to have slowed down substantially. After an additional one-hour run, the reaction was terminated and the product washed five times with water. It was then neutralized by washing with sodium carbonate and a saturated solution of sodium chloride. The product was finally dried with an anhydrous sodium sulfate and separated by filtration. Analysis indicated an oxirane oxygen content of 4.22% or 76.2% of the theory.

In a similar manner, other epoxidized esters of tetrahydrophthalic acid were prepared with the following results:

(1) Dimethyl ester 5.72% oxirane oxygen (71.0% of theory).
(2) Dioctyl ester 3.66% oxirane oxygen (95% of theory).
(3) Dihexyl ester 4.0% oxirane oxygen (88.5% of theory).
(4) Didecyl ester 3.3% oxirane oxygen (95.3% of theory).
(5) Butyl decyl ester 3.2% oxirane oxygen (76.2% of theory).
(6) Di-iso-octyl ester 3.5% oxirane oxygen (90.0% of theory).

Some of these epoxidized esters of tetrahydrophthalic acid are lowmelting solids, others are liquids and they all have low vapor pressures. This is an important factor contributing to the particularly good compatibility and lack of sweat-out in resin compositions plasticized with these esters.

The overall plasticizing properties of the plasticizers of this invention are equal to or better than the plasticizing properties of the widely used dioctyl phthalate plasticizers. Some important characteristics of a polyvinyl chloride resin plasticized with epoxidized dioctyl tetrahydrophthalate may be listed here for a milled sheet containing 35%, by weight, of the plasticizer.

Modulus at 100% elongation at 25° C. _____ 2070
Ultimate tensile strength, lbs. per sq. in. at 25° C. __ 3170
Percent elongation at 25° C. _____ 260
Shore hardness at 25° C. _____ 76
Minimum flex temperature (Clash & Berg test),
  ° C. _____ −22

The following examples will illustrate particularly the superior performance of the plasticizers of this invention under conditions of high temperature:

All milled sheets described in the following were formulated with a small quantity of stabilizer, notably 1% by weight cadmium stearate.

Example 1

A polyvinyl chloride resin was plasticized with 35% by weight of epoxidized dioctyl tetrahydrophthalate and formed into a milled sheet. Samples of that sheet were exposed for five months to diffuse daylight without showing sweat-out. Other samples were subjected to a heat test by exposure to a temperature of 350° F. for 120 minutes. The originally colorless sample after the heat test was of a light yellow color. A corresponding sample plasticized with dioctyl phthalate turned dark reddish brown during the heat test.

Example 2

A polyvinyl chloride resin was plasticized with 35% by weight of epoxidized butyl decyl tetrahydrophthalate and formed into a milled sheet. Samples of that sheet were exposed for five months to diffuse daylight without showing sweat-out. Other samples were subjected to a heat test by exposure to a temperature of 350° F. for 120 minutes. The originally colorless sample after the heat test had discolored only to a light amber color.

Example 3

A polyvinyl chloride resin was plasticized with 35% by weight of epoxidized di-isobutyl tetrahydrophthalate and formed into a milled sheet. Samples of that sheet were exposed for five months to diffuse daylight without showing sweat-out. Other samples were subjected to a heat test by exposure to a temperature of 350° F. for 120 minutes. The originally colorless sample after the heat test was of a very light yellow color.

Example 4

In this example, vinyl chloride-vinyl acetate copolymer was plasticized with epoxidized didecyl tetrahydrophthalate by incorporating 35% by weight of the plasticizer and forming the resin into a milled sheet. Samples of that sheet were exposed for 5 months to diffuse daylight without showing sweat-out. Other samples were subjected to a heat test by exposure to a temperature of 350° F. for 120 minutes. The originally colorless sample after the heat test was of a very light yellow color.

Example 5

In this example, a polyvinyl acetate resin dissolved in methyl ethyl ketone and containing about 20% of epoxidized dibutyl tetrahydrophthalate as plasticizer was cast on a glass plate to form a film. After evaporation of the solvent, the cast film was baked for 30 minutes at 105° C. The cast film remained clear and undiscolored.

Polyvinyl chloride resins in common with chlorinated polymers tend to decompose under the action of heat and light. The resulting degradation results in discoloration of the resins with accompanying embrittlement. Accordingly, in formulating a polyvinyl chloride resin, it is necessary to incorporate a stabilizer therein to prevent discoloration. This is in addition to the usual plasticizers. Metallic fatty acid soaps are generally employed for the purpose of imparting stability against the action of heat or light.

The epoxy plasticizers of this invention also inherently possess stabilizing properties and are, therefore, stabilizing plasticizers. Using an epoxy plasticizer of the type described herein, it is possible (1) completely to eliminate the use of the standard metallic stabilizer or (2) to lower the quantity of metallic stabilizer required in the formulation. Therefore, when employing the epoxy plasticizers of this invention, it is necessary to employ metallic stabilizers only where conditions of ultimate use of the formulated resin indicate severe high temperature exposure or severe light exposure.

The examples given above are for the purpose of illustrating the principles of the invention and are not to be deemed as limitative since the invention shows that the epoxidized ethylenic linkage in the tetrahydrophthalate produces a product of better plasticizing properties for polyvinyl resins as compared to the well known dioctyl phthalate and brings into the realm of plasticizer use, a great number of new materials as plasticizers for polyvinyl resins.

What is claimed is:

1. A polyvinyl resin composition from the group consisting of polyvinyl chloride, polyvinyl acetate, and copolymers of vinyl acetate and vinyl chloride, plasticized with an epoxidized dialkyl ester of tetrahydrophthalic acid, wherein the alkyl groups in said epoxidized dialkyl ester each have 1 to 10 carbon atoms, and said epoxidized dialkyl ester has its epoxy oxygen attached directly to the tetrahydrophthalate ring.

2. A polyvinyl resin composition from the group consisting of polyvinyl chloride, polyvinyl acetate, and copolymers of vinyl acetate and vinyl chloride, plasticized with an epoxidized dioctyl tetrahydrophthalate, said epoxidized dioctyl tetrahydrophthalate having its epoxy oxygen attached directly to its tetrahydrophthalate ring.

3. A polyvinyl resin composition from the group consisting of polyvinyl chloride, polyvinyl acetate, and copolymers of vinyl acetate and vinyl chloride, plasticized with an epoxidized butyl decyl tetrahydrophthalate, said epoxidized butyl decyl tetrahydrophthalate having its epoxy oxygen attached directly to its tetrahydrophthalate ring.

4. A polyvinyl resin composition from the group consisting of polyvinyl chloride, polyvinyl acetate, and copolymers of vinyl acetate and vinyl chloride, plasticized with an epoxidized diisobutyl tetrahydrophthalate, said epoxidized diisobutyl tetrahydrophthalate having its epoxy oxygen attached directly to its tetrahydrophthalate ring.

5. A polyvinyl resin composition from the group consisting of polyvinyl chloride, polyvinyl acetate, and copolymers of vinyl acetate and vinyl chloride, plasticized with an epoxidized dibutyl tetrahydrophthalate, said epoxidized dibutyl tetrahydrophthalate having its epoxy oxygen attached directly to its tetrahydrophthalate ring.

6. A polyvinyl resin composition from the group consisting of polyvinyl chloride, polyvinyl acetate, and copolymers of vinyl acetate and vinyl chloride, plasticized with an epoxidized didecyl tetrahydrophthalate, said epoxidized didecyl tetrahydrophthalate having its epoxy oxygen attached directly to its tetrahydrophthalate ring.

References Cited in the file of this patent

UNITED STATES PATENTS

| | | |
|---|---|---|
| 2,671,064 | Cowell et al. | Mar. 2, 1954 |
| 2,783,250 | Payne et al. | Feb. 26, 1957 |
| 2,794,030 | Phillips et al. | May 28, 1957 |

OTHER REFERENCES

Gill et al.: J. Chem. Soc., 1953, page 4631.

Witnauer et al.: Epoxy Esters As Plasticizers and Stabilizers for Vinyl Chloride Polymers, Ind. Eng. Chem., volume 47, No. 11, November 1955, page 2304.